United States Patent
Lennen (10) Patent No.: US 9,459,353 B2
(45) Date of Patent: Oct. 4, 2016

(54) METHOD AND APPARATUS FOR MANAGING TRACKING LOOPS FOR ENHANCED SENSITIVITY TRACKING OF GNSS SIGNALS

(75) Inventor: Gary Lennen, Cupertino, CA (US)

(73) Assignee: CSR TECHNOLOGY INC., Sunnyvale, CA (US)

( * ) Notice: Subject to any disclaimer, the term of this patent is extended or adjusted under 35 U.S.C. 154(b) by 520 days.

(21) Appl. No.: 13/341,851

(22) Filed: Dec. 30, 2011

(65) Prior Publication Data

US 2013/0169479 A1    Jul. 4, 2013

(51) Int. Cl.

| G01S 19/25 | (2010.01) |
|---|---|
| G01S 19/24 | (2010.01) |
| G01S 19/29 | (2010.01) |
| G01S 19/30 | (2010.01) |
| H04B 1/7085 | (2011.01) |
| H04B 1/00 | (2006.01) |

(52) U.S. Cl.
CPC .............. *G01S 19/24* (2013.01); *G01S 19/29* (2013.01); *G01S 19/30* (2013.01); *H04B 1/7085* (2013.01); *G01S 19/246* (2013.01); *H04B 2201/70715* (2013.01)

(58) Field of Classification Search
CPC ........ G01S 19/24; G01S 19/29; G01S 19/30; G01S 19/26; G01S 19/246; H04B 2201/70715; H04B 1/7085
USPC ............ 342/357.68, 357.63, 357.69, 357.64; 375/149, 150
See application file for complete search history.

(56) References Cited

U.S. PATENT DOCUMENTS

| 5,521,941 A | 5/1996 | Wiatrowski et al. |
|---|---|---|
| 6,313,789 B1 | 11/2001 | Zhodzishsky et al. |
| 6,373,862 B1 * | 4/2002 | Kiasaleh ............... H04B 1/7085 370/515 |
| 6,771,713 B1 * | 8/2004 | Lui ........................ H04L 7/0054 329/308 |
| 7,301,379 B1 | 11/2007 | Burlingame et al. |
| 7,570,207 B2 * | 8/2009 | Kimura ..................... 342/357.63 |
| 7,613,258 B2 * | 11/2009 | Yu et al. ....................... 375/346 |
| 7,859,456 B2 * | 12/2010 | Wang et al. .............. 342/357.63 |
| 7,924,220 B1 | 4/2011 | Lennen |
| 9,176,232 B2 | 11/2015 | Lennen |
| 2001/0020216 A1 | 9/2001 | Lin |
| 2005/0041724 A1 * | 2/2005 | Chansarkar ................... 375/149 |

(Continued)

FOREIGN PATENT DOCUMENTS

| CN | 101839987 | 9/2010 |
|---|---|---|
| CN | 102176026 A | 9/2011 |

(Continued)

OTHER PUBLICATIONS

Pany, Coherent Integration Time: The longer, the Better, Nov./Dec. 2009, InsideGNSS.*

(Continued)

*Primary Examiner* — Frank J McGue
(74) *Attorney, Agent, or Firm* — The Marbury Law Group, PLLC (57) ABSTRACT

The present invention is related to location positioning systems, and more particularly, to a method and apparatus for making accuracy improvements to a GPS receiver's navigation calculations. According to a first aspect, the invention includes extreme sensitivity GNSS tracking loops. In embodiments, the tracking loops are self-bandwidth normalizing and the loop bandwidths automatically narrow with reduced CNO.

17 Claims, 10 Drawing Sheets

(56) References Cited

U.S. PATENT DOCUMENTS

| | | |
|---|---|---|
| 2006/0097914 A1 | 5/2006 | Rao et al. |
| 2006/0159161 A1* | 7/2006 | Murakami .................... 375/149 |
| 2007/0205940 A1* | 9/2007 | Yang et al. .............. 342/357.12 |
| 2010/0328145 A1 | 12/2010 | Wang et al. |
| 2011/0193741 A1* | 8/2011 | Kumar .................... 342/357.25 |

FOREIGN PATENT DOCUMENTS

| | | |
|---|---|---|
| JP | H07128431 A | 5/1995 |
| JP | H0862318 A | 3/1996 |
| JP | 2006-349587 | 12/2006 |
| JP | 2011-058923 | 3/2011 |
| NO | 2008147232 A1 | 12/2008 |
| WO | 03034090 A2 | 4/2003 |
| WO | 2009073522 A1 | 6/2009 |
| WO | 2011100475 A1 | 8/2011 |

OTHER PUBLICATIONS

Petovello, Weak Signal Carrier Tracking Using Extended Coherent Integration with an Ultra-Tight GNSS/IMU Receiver, Apr. 2008, European Navigation Conference.*

Braasch, GPS Receiver Architectures and Measurements, Jan. 1999(, Proceedings of the IEEE, vol. 87, No. 1.*

* cited by examiner

METHOD AND APPARATUS FOR MANAGING TRACKING LOOPS FOR ENHANCED SENSITIVITY TRACKING OF GNSS SIGNALS

FIELD OF THE INVENTION

The present invention is related to location positioning systems, and more particularly, to a method and apparatus for managing tracking loops for enhanced sensitivity tracking of GNSS signals.

BACKGROUND OF THE INVENTION

With the development of radio and space technologies, several satellites based navigation systems (i.e. satellite positioning system or "SPS") have already been built and more will be in use in the near future. Those systems with full global coverage are sometimes referred to as Global Navigation Satellite Systems ("GNSS"). SPS receivers, such as, for example, receivers using the Global Positioning System ("GPS"), also known as NAVSTAR, have become commonplace. Other examples of SPS and/or GNSS systems include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS"), any future Western European SPS such as the proposed "Galileo" program, or any other existing or future system such as the Chinese "Beidou" or "Compass" system. As an example, the U.S. NAVSTAR GPS system is described in GPS Theory and Practice, Fifth ed., revised edition by Hofmann-Wellenhof, Lichtenegger and Collins, Springer-Verlag Wien New York, 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

In environments where satellite signals are degraded, however, a GPS receiver often encounters problems in locking onto the signals that are needed for the calculation of position, velocity, altitude, and time. In a degraded signal environment, satellite signals can be weak or otherwise difficult for GPS receivers to lock on to. One example of a degraded signal environment is a tunnel through which a car equipped with a GPS receiver is driving. While the GPS receiver is in the tunnel, the satellite signals are completely obstructed and no lock can be acquired. As a result, the GPS receiver cannot accurately calculate its position and other navigational data (such as velocity, altitude, and time) while the car is in the tunnel. In addition, because GPS receivers typically utilize positioning algorithms that use navigational filters that account for the GPS receivers' last-known positions, the GPS receiver's position calculation when the car emerges from the tunnel can also be less accurate since accurate position calculations were not performed during the time that the car was in the tunnel.

Degraded signal environments are often encountered in urban areas, such as cities with many tall buildings. A city with many tall buildings contains "urban canyons", which are environments where streets cut through dense blocks of structures such as skyscrapers. In urban canyons, satellite signals are frequently not visible or are degraded due to the signals being partially or fully blocked by buildings, for example. Consequently, the problem of inaccurate position calculations by GPS receivers in degraded signal environments is especially acute in urban areas. Other degraded environments include tunnels, garages, and inside buildings.

Existing techniques such as data aiding have succeeded in improving tracking performance in weak signal environments from 30 dB-Hz down to about 10 dB-Hz. However, further improvements in sensitivity are needed, as well as a need to provide a robust architecture that can handle various signal environments.

SUMMARY OF THE INVENTION

The present invention is related to location positioning systems, and more particularly, to a method and apparatus for making accuracy improvements to a GPS receiver's navigation calculations. According to a first aspect, the invention includes extreme sensitivity GNSS tracking loops. In embodiments, the tracking loops are self-bandwidth normalizing and the loop bandwidths automatically narrow with reduced CNO.

In furtherance of these and other aspects, a GNSS tracking apparatus according to embodiments of the invention includes a magnitude estimator that determines an estimate of GNSS signal strength; a tracking loop discriminator that receives the estimate from the magnitude estimator and automatically sets a bandwidth of the tracking loop discriminator based on the estimate; and a loop filter that receives an output from the tracking loop discriminator and provides a value that is used to control an oscillator in a tracking loop.

In additional furtherance of these and other aspects, a GNSS tracking method according to embodiments of the invention includes determining an estimate of GNSS signal strength in a tracking loop; automatically setting a bandwidth of a tracking loop discriminator based on the estimate; and calculating a value that is used to control an oscillator in the tracking loop based on an output of the tracking loop discriminator.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
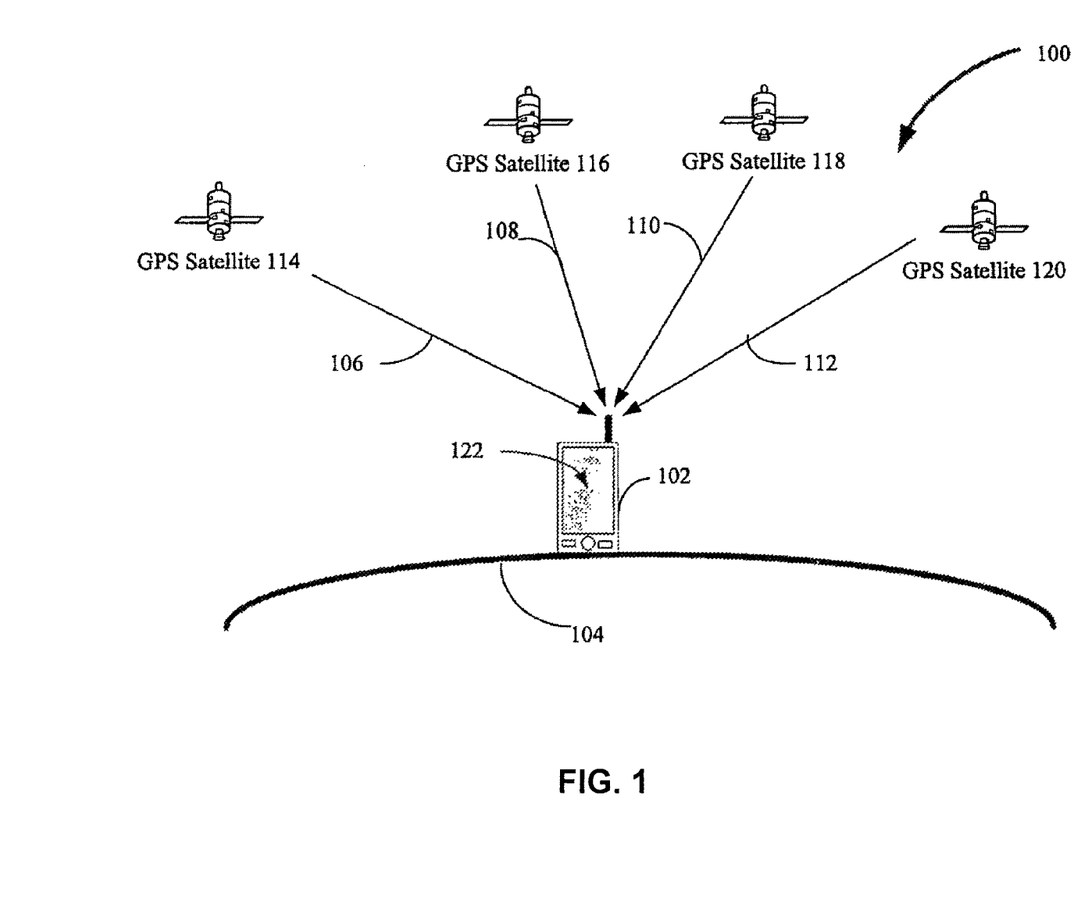
FIG. 1 is a block diagram of an example implementation of principles of the invention.

FIG. 1 illustrates an example implementation of embodiments of the invention. As shown in FIG. 1, GNSS system 100 includes GPS satellites (i.e. SVs) 114, 116, 118 and 120 that broadcast signals 106, 108, 110 and 112, respectively, that are received by receiver 122 in handset 102, which is located at a user position somewhere relatively near the surface 104 of earth.

Handset 102 can be a personal navigation device (PND, e.g. from Garmin, TomTom, etc.) or it can be a cellular or other type of telephone with built-in GPS functionality (e.g. iPhone, Blackberry, Android smartphone, etc.), or any GPS device embedded in tracking applications (e.g. automotive tracking from Trimble, package or fleet management tracking from FedEx, child locator tracking applications etc).

Receiver 122 can be implemented using any combination of hardware and/or software, including GPS chipsets such as SiRFstarIII GSD3tw, SiRFstarIV, SiRFstarV or SiRFstar GSC3e from SiRF Technology and BCM4750 from Broadcom Corp., as adapted and/or supplemented with functionality in accordance with the present invention, and described in more detail herein. More particularly, those skilled in the art will be able to understand how to implement the present invention by adapting and/or supplementing such chipsets and/or software with the tracking loop improvement techniques of the present invention after being taught by the present specification.

The present inventors recognize that the need for accurate location assistance during situations (e.g. city driving, indoors) where signal levels are very weak (e.g. as low as −165 dBm) is an especially acute need. In general, the present invention provides a tracking architecture that is flexible to accommodate such weak signal situations, without affecting tracking performance in other signal situations. In embodiments, this architecture includes tracking loops that have their bandwidths automatically adjusted in correspondence with changes of signal strength (e.g. CNO). In these and other embodiments, this architecture includes using longer coherent integration periods that are optimized for various signal conditions and local carrier oscillator (i.e. TCXO) dynamics.

Figure 2:
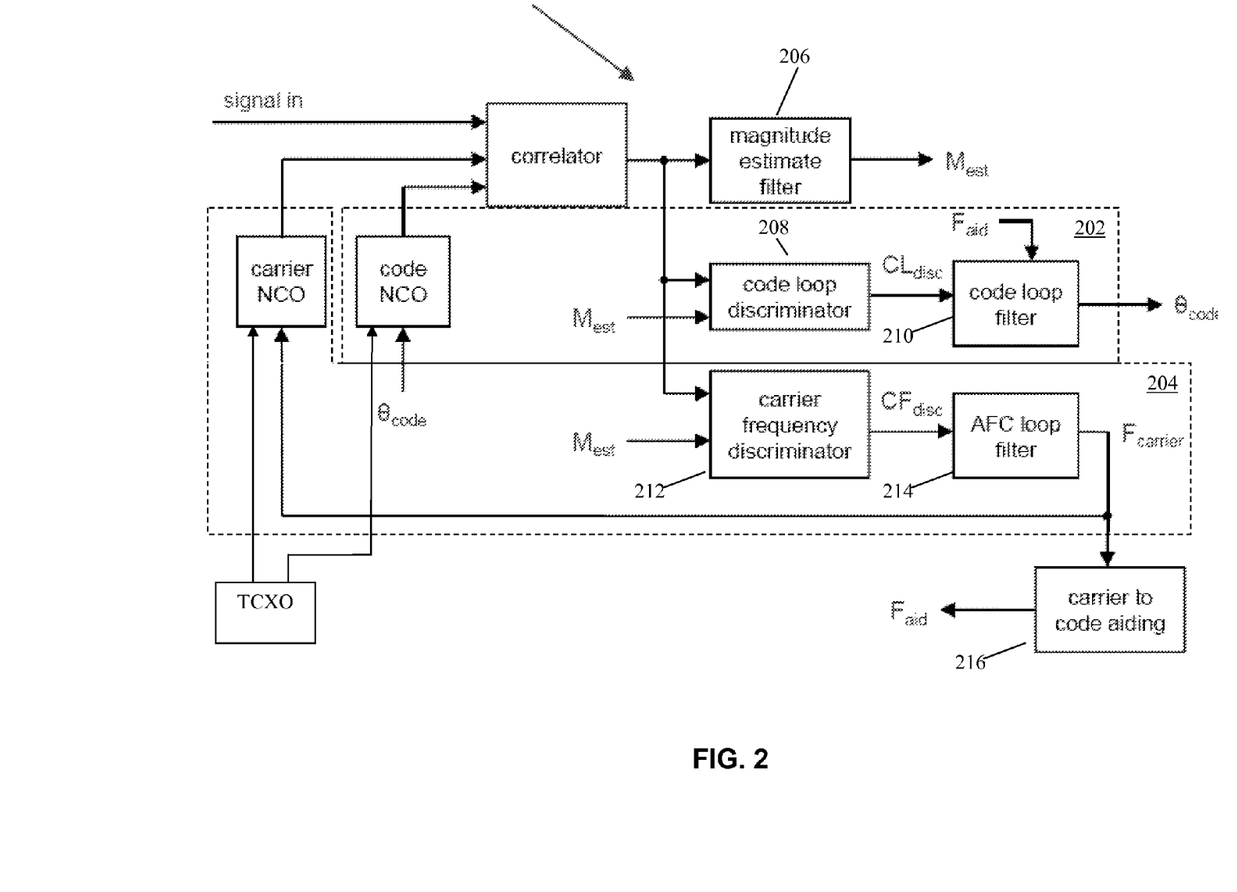
FIG. 2 is a block diagram illustrating an example tracking architecture according to embodiments of the invention.

FIG. 2 shows an overview of an example −165 dBm capable tracking architecture in accordance with embodiments of the invention. As shown in FIG. 2, it includes first order code tracking loop 202 and a second order carrier AFC tracking loop 204.

According to aspects of the present invention, each loop contains a discriminator (code phase 208, carrier frequency 212) that is gain normalized using a signal magnitude estimate ($M_{est}$). In embodiments, and in accordance with aspects of the invention, the loop discriminators 208, 212 and magnitude estimate filter 206 use 100 msec coherent integrations as their inputs (I100 msecs, Q100 msecs).

As in conventional designs, the output of the code tracking loop 202 ($\theta_{code}$) provides the feedback to drive the code NCO, situated before the correlation operation. The output of the carrier AFC loop ($F_{carrier}$) provides the feedback to drive the carrier NCO, also situated before the correlation operation. An alternative software feedback code/carrier NCO is also possible.

In embodiments, the code tracking loop 202 is first order and is frequency aided from the carrier AFC loop, via the carrier to code aiding block 216, as described in more detail below.

Figure 3A:
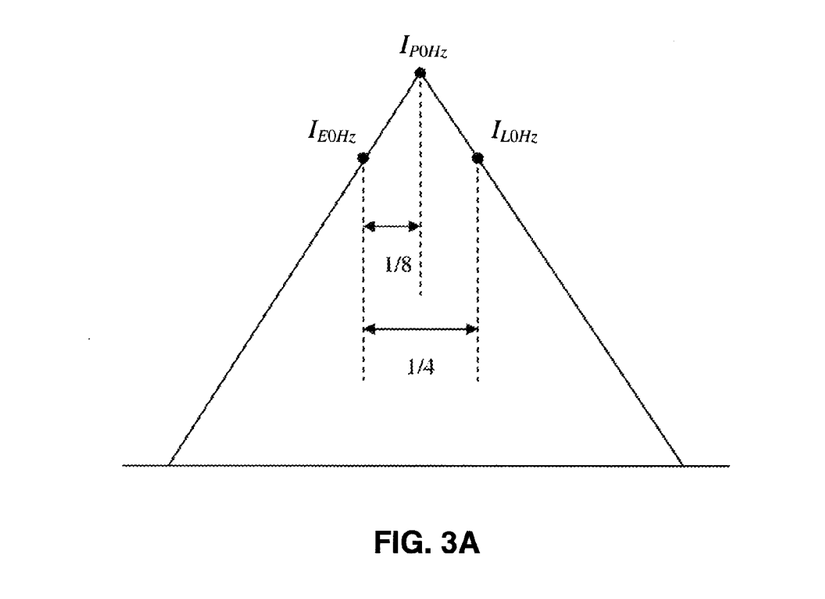
FIGS. 3A-B illustrate code tracking loop correlator chip spacing in embodiments of the invention.
Figure 3B:
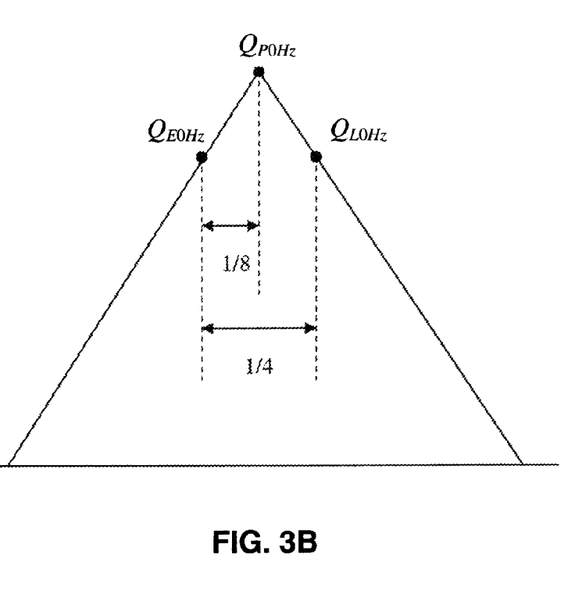

The magnitude estimate is formed in block 206 from the on-frequency (0 Hz carrier offset) I and Q punctual correlators. FIGS. 3A and 3B provide a graphical representation of the on-frequency correlators as the terms are used below. In embodiments, a magnitude estimate is first formed every 100 msecs as follows:

$$M_{100\ msecs}(k) = \text{SQRT}[(I_{P0Hz}(k))^2 + (Q_{P0Hz}(k))^2]$$

Where $M_{100\ msecs}$ is the signal magnitude estimate every 100 msecs. $I_{P0Hz}$, $Q_{P0Hz}$ are the 0 Hz carrier offset I and Q 100 msec coherent correlations respectively. The filtered magnitude estimate provided by estimator 206 is now derived as follows:

$$M_{est}(k+1) = ((1-\alpha_{Mest})M_{est}(k)) + [\alpha_{Mest}M_{100\ msecs}(k)]$$

Where $\alpha_{Mest} = \frac{1}{2}N$. The value of N is preferably settable and in example embodiments is in the range 3 . . . 5. In embodiments, $M_{est}$ can be initialized before tracking begins with a signal magnitude value derived during the verify or handover from primary track stage. The inverse of $M_e$, is created as follows:

$$M_{est\ inverse}(k+1) = 1/M_{est}(k+1)$$

The loop discriminators use $M_{est\ inverse}$ to normalize themselves under varying CNO conditions as will be described in more detail below.

One question of interest is how well the filtered $M_{est}$ value represents the actual signal level over the CNO range. The present inventors have determined that above 40 dB-Hz all coherent integration periods (i.e. PDIs) provide an accurate representation of the CNO change. The longer the PDI and the lower the CNO the $M_{est}$ value still provides a good representation of the actual signal amplitude. However, as the SNR in the PDI period drops below about 0 dB-Hz the filtered $M_{est}$ starts to represent the noise magnitude rather than the signal magnitude. As explained in more detail below, when the value of $M_{est}$ flattens out for lower CNOs, the loop gains must be increased to maintain a given bandwidth. Using a 100 msec PDI, $M_{est}$ maintains linearity down to approximately 15 dB-Hz, and it then starts to flatten out towards 5 dB-Hz. Thus a loop gain correction term is preferably used to maintain or set loop bandwidths below 15 dB-Hz. For the −165 dBm tracking loops, no loop gain correction term is applied and the loop bandwidths are allowed to narrow automatically. In particular, the loops have a fixed high CNO bandwidth and the bandwidth narrows with respect to this value towards 5 dB-Hz.

As mentioned above, in embodiments, the code tracking loop 202 is first order with frequency aiding from the carrier AFC loop. In these and other embodiments, the early/late spacing is ¼ chip, as shown in FIGS. 3A and 3B.

Figure 4:
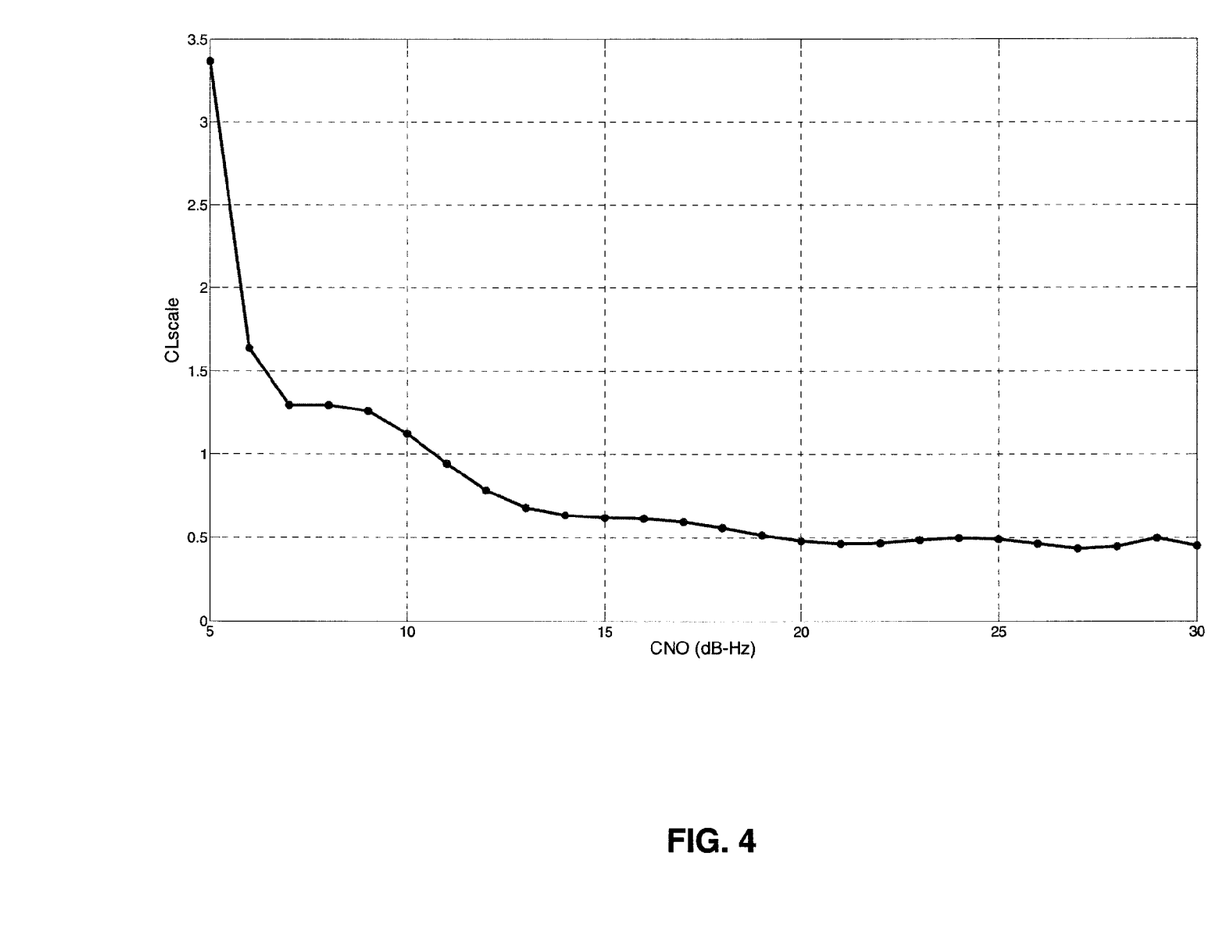
FIG. 4 is a graph illustrating a scaling factor that is used to automatically adjust code tracking loop bandwidth for different CNOs.
Figure 5:
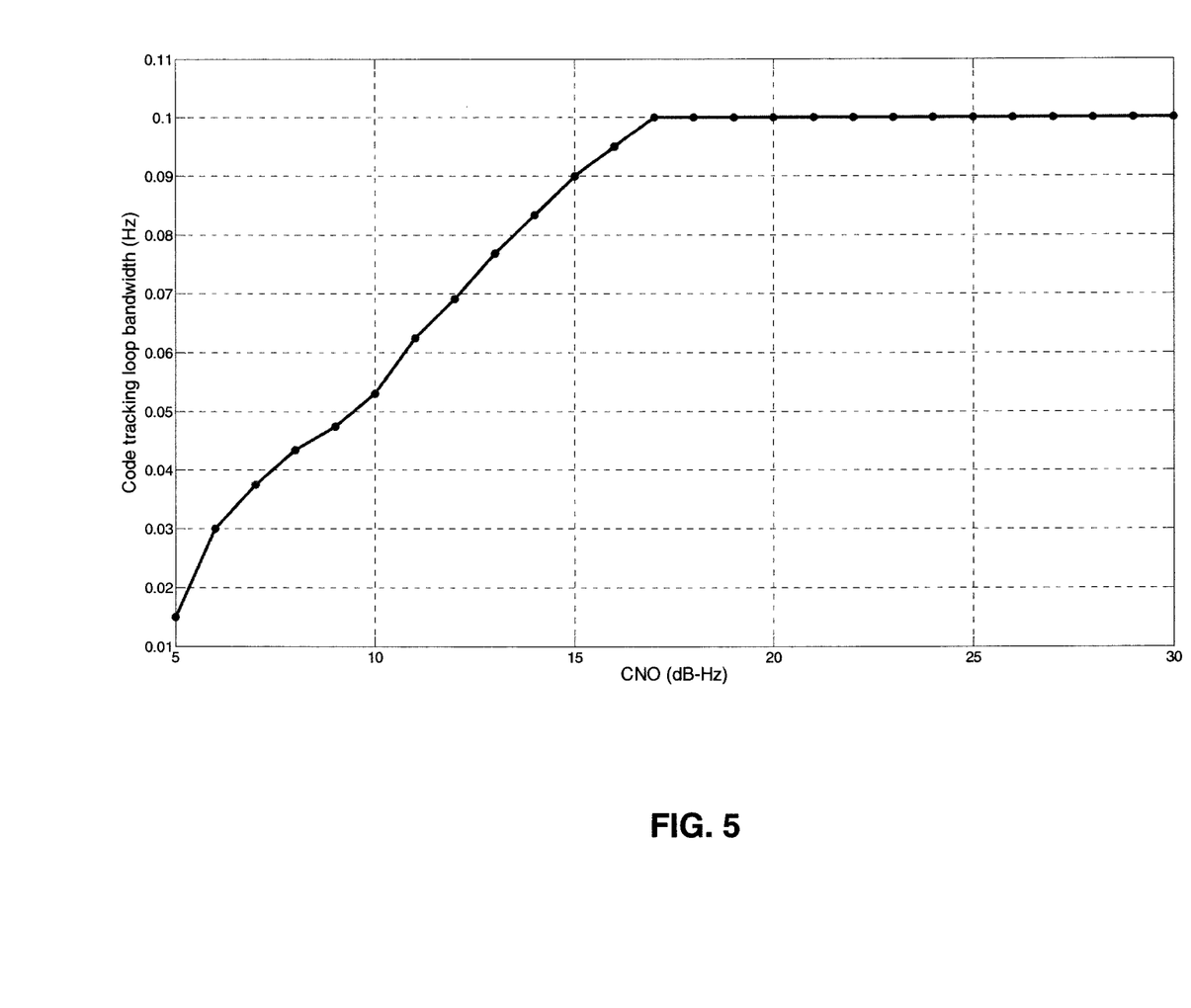
FIG. 5 is a graph illustrating an example of how code tracking loop bandwidth is automatically adjusted for different CNOs in embodiments of the invention.

In embodiments, the code loop discriminator 208 is derived from the carrier on-frequency early and late I and Q correlators as follows:

$$CL_{early}(k)=\text{SQRT}[(I_{E0Hz}(k))^2+(Q_{E0Hz}(k))^2]$$

$$CL_{late}(k)=\text{SQRT}[(I_{L0Hz}(k))^2+(Q_{L0Hz}(k))^2]$$

$$CL_{disc}(k+1)=CL_{scale}\times(CL_{early}(k)-CL_{late}(k))/M_{est}(k+1)$$

Where $I_{E0Hz}$, $Q_{E0Hz}$, $I_{L0Hz}$ and $Q_{L0Hz}$ are as shown in FIGS. 3A and 3B. The scaling factor $CL_{scale}$ (units in C/A chips) is used to set the code discriminator 208 output such that $CL_{disc}(k+1)$ represents the actual code phase offset near the code loop locked condition (e.g. <⅛th chip offset). For an IF equivalent bandwidth of 6 MHz and ¼ chip spacing FIG. 4 shows how $CL_{scale}$ varies with CNO to normalize the code loop discriminator 208. In one embodiment, $CL_{scale}$ is fixed at 0.5, the high CNO value, and the variation for lower CNOs is used to automatically reduce the code tracking loop bandwidth with reduced CNO. A possible alternative to this embodiment is when in secondary track only mode where CNO based loop bandwidth switching may be included to improve dynamic performance at higher CNOs. FIG. 5 shows the approximate code loop bandwidth versus CNO.

In embodiments, the code loop filter 210 coefficient that sets the code loop bandwidth is given as follows:

$$CL_{coeff}=(4\times CL_{bandwidth})/F_s$$

Where $CL_{bandwidth}$ is the one-sided equivalent noise bandwidth of the code loop. $CL_{bandwidth}$ is set to 0.1 Hz for all CNOs in some embodiments, $F_S$ is the loop sampling (update) rate, for example, $F_S$=10 Hz. In embodiments, the full code loop filter is implemented as follows:

$$code_{phase}(k+1)=code_{phase}(k)+(CL_{coeff}\times CL_{disc}(k+1))$$

Where, $code_{phase}$ is the code phase in chips updated every 100 msecs. The carrier to code aiding term updates the code phase every 1 msec as follows:

$$code_{phase}(j+1)=code_{phase}(j)+[0.001\times F_{aid}(j+1)]$$

Where j is updated every 1 msec.

The carrier to code aiding 216 term $F_{aid}$ above is formed by dividing the carrier frequency offset, formed at the output of the carrier AFC loop, by the ratio of carrier to code frequency in the GPS transmission. This value is 1575.42 MHz/1.023 MHz=1540.

Therefore the $F_{aid}$ term is given by:

$$F_{aid}(j+1)=F_{carrier}(j+1)/1540$$

Where $F_{carrier}$ is the carrier frequency offset (Hz) from nominal (0 Hz=no Doppler and no oscillator offset). $F_{aid}$ is therefore in units of Hz at the code frequency (nominally 1.023 MHz) and in some embodiments is updated every 20 msecs, with the correction term applied to the hardware every 1 msec. One example architecture according to the invention can perform carrier to code aiding at the hardware level, with direct connection between carrier and code NCOs. This mechanism can be used when the secondary track channel is implemented via hardware.

Figure 6A:
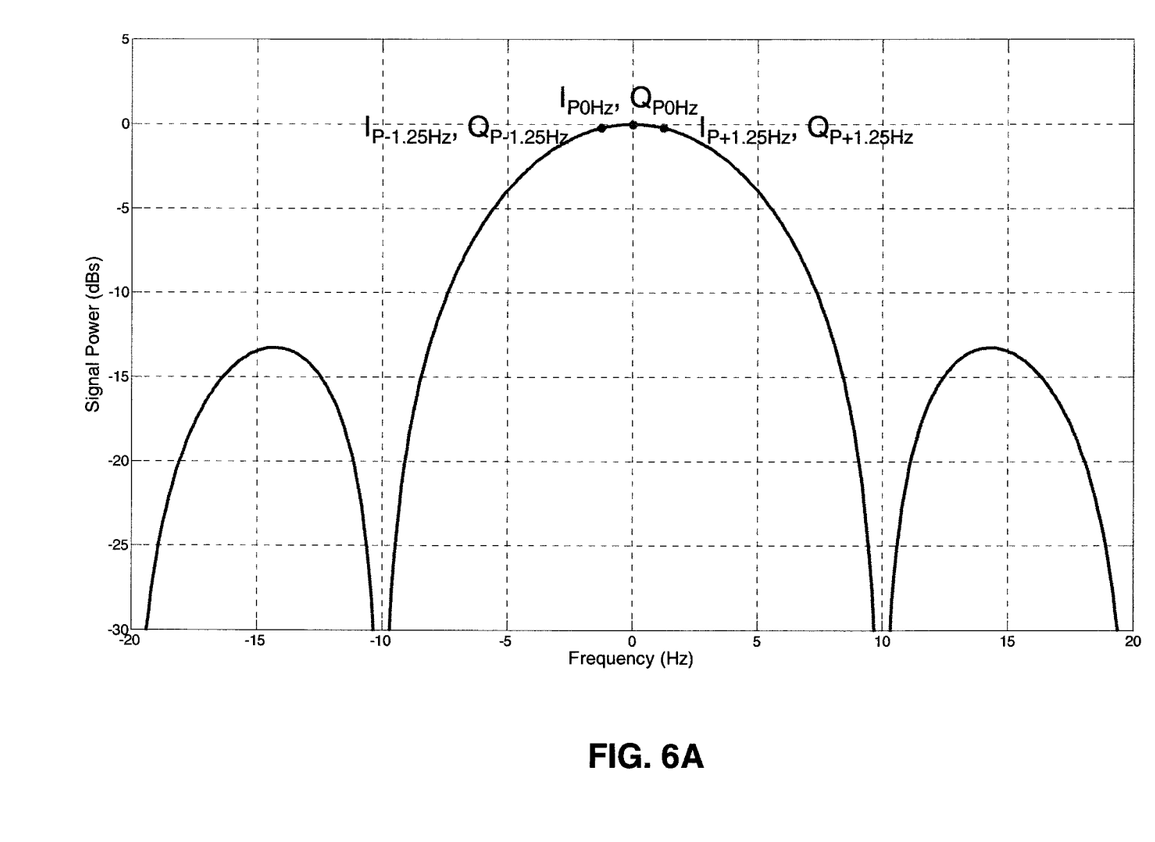
FIGS. 6A-B illustrate carrier tracking loop correlator frequency spacing in embodiments of the invention.
Figure 6B:
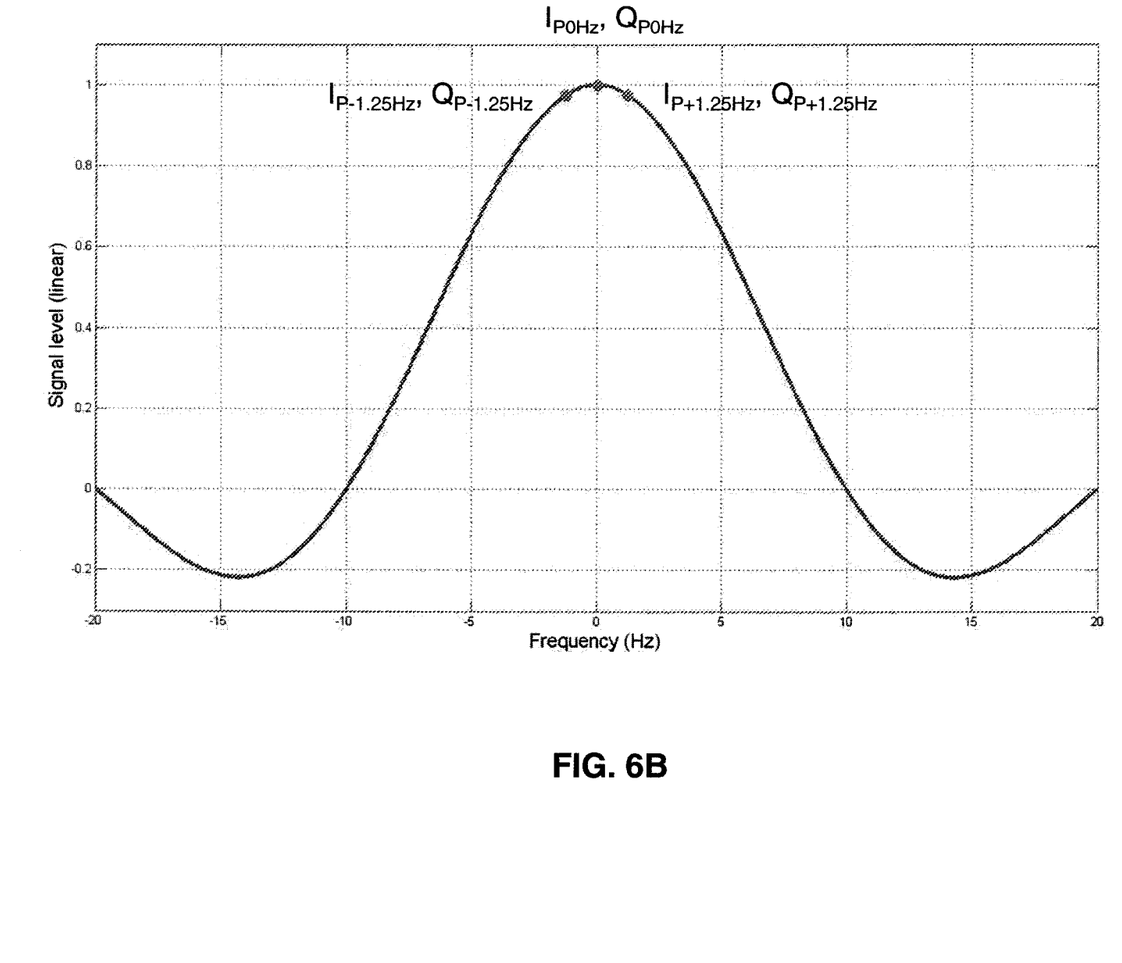

In embodiments, carrier AFC loop 204 is second order. In one possible example, the carrier AFC discriminator 212 is derived from three sets of frequency domain separated correlators, as illustrated in FIGS. 6A and 6B. The carrier on-frequency punctual correlators ($I_{P0Hz}$, $Q_{P0Hz}$) were previously described above as inputs to the magnitude estimate loop. In one example implementation, the carrier AFC loop 204 uses two additional correlator sets, offset by ±1.25 Hz for the carrier on-frequency correlators.

In embodiments, the carrier AFC loop discriminator 212 is given as follows:

$$\text{freq}_{-1.25}(k)=\text{SQRT}[(I_{P-1.25\,Hz}(k))^2+(Q_{P-1.25\,Hz}(k))^2]$$

$$\text{freq}_{+1.25}(k)=\text{SQRT}[(I_{P+1.25\,Hz}(k))^2+(Q_{P+1.25\,Hz}(k))^2]$$

$$CF_{disc}(k+1)=(AFC_{scale}\times(\text{freq}_{-1.25}(k)-\text{freq}_{+1.25}(k)))/M_{est}(k+1)$$

Where $CF_{disc}$ is in Hz and the additional $AFC_{scale}$ term is used to normalize $CF_{disc}$ for high CNO. The AFC loop bandwidth then automatically reduces with lower CNOs. $AFC_{scale}$ has a fixed value of 12.5 in one possible implementation.

The present inventors have determined that the discriminator gain reduces as CNO reduces with the AFC discriminator being much smaller than the actual frequency offset for the 5 dB-Hz case. Table 1 shows how this impacts the AFC loop bandwidth with varying CNO.

TABLE 1

| CNO (dB-Hz) | approximate AFC loop bandwidth (Hz) |
| --- | --- |
| 30 | 0.20 |
| 20 | 0.20 |
| 15 | 0.17 |
| 10 | 0.10 |
| 5 | 0.04 |

In embodiments, the carrier AFC loop filter 214 coefficients, including setting of AFC loop bandwidth, are given as follows:

$$\omega_{nf}=1.89\times AFC_{bandwidth}/10$$

$$D_1=\text{SQRT}(2)\times\omega_{nf}$$

$$D_2=\omega_{nf}^2$$

Where $AFC_{bandwidth}$ is the one-sided equivalent noise bandwidth of the AFC loop. The $AFC_{bandwidth}$ term is chosen such that the tracking loop is capable of tracking the lowest desired CNO. In example Table 1, this is 5 dB-Hz and the target bandwidth is 0.04 Hz at 5 dB-Hz to maintain track, this leads to a bandwidth requirement of 0.2 Hz at high CNO. The carrier AFC loop filter 214 is therefore given as follows:

$$AFC_{accel}(k+1) = AFC_{accel}(k) + (D_2 \times CF_{disc})$$

$$F_{carrier}(k+1) = F_{carrier}(k) + (D_1 \times CF_{disc}) + AFC_{accel}(k+1)$$

Where $F_{carrier}$ is in units of Hz. In embodiments, $F_{carrier}$ is initialized before tracking to the best carrier frequency estimate provided by the verification or primary track channel handover stage. $AFC_{accel}$ is the loop filter's estimate of acceleration, and is used to update $F_{carrier}$.

The present inventors recognize that the reduction in damping ratio of a second order loop is proportional to the square root of the CNO. This potentially creates a situation where the AFC loop becomes severely under-damped at low CNOs (effectively causing excessive loop oscillation). For example implementations in accordance with embodiments of the invention, the inventors observed that the damping ratio has indeed reduced as the CNO has dropped to 5 dB-Hz, but not to levels considered excessive.

In embodiments described above, the loop discriminators 208, 212 and magnitude estimate filter 206 use 100 msec coherent integrations as their inputs (I100 msecs, Q100 msecs). According to aspects of the invention, this PDI is preferred based on a number of factors, including that it is generally practical given typical TCXO dynamics. In this regard, the present inventors note that longer coherent integration periods may not always be feasible when TCXO components having certain dynamics are used. The following describes how dynamics such as the phase noise of a TCXO component can be modeled, for use in simulations for determining whether a preferred PDI is possible for a given TCXO, for example.

In one example, TABLE 2 shows a typical manufacturer's TCXO phase noise specification (for example, a Rakon TCXO IT3200C, ±0.5 ppm). The phase noise power density at the GPS L1 frequency is computed as follows:

$$P_{noise\ L1} = P_{noise\ 16fo} + 20 \log_{10}(1575.42/16.369)$$

The TCXO model generates phase noise that can be applied to the modeled received GPS signal.

TABLE 2

| SSB phase noise power density frequency offset (Hz). | SSB phase noise power density for 26 MHz (dBc/Hz) | SSB phase noise power density for 1.57542 GHz (dBc/Hz) |
|---|---|---|
| 1 | −60 | −20 |
| 10 | −89 | −49 |
| 100 | −113 | −73 |
| 1000 | −132 | −92 |
| 10000 | −145 | −105 |

In embodiments, the TCXO model is constructed as follows:

Step 1: Assume the sample rate ($F_s$) is 2 kHz and use manufacturer's (translated to L1) TCXO power density numbers for 1, 10, 100 and 1000 Hz. This includes the bulk of the phase noise energy that impacts longer coherent integration periods.

Step 2: Number of phase noise samples to generate=$N_s$. $N_s$=200,000 for 100 seconds worth of 2 kHz samples.

Step 3: Interpolate in the $\log_{10}$ frequency versus power density domain. This process uses the FFT concept where the positive frequency is defined from 0 to $F_s/2$ Hz. The FFT negative frequency are the conjugate image of the positive frequency spectrum.

Step 4: The DC term is set to zero in the FFT.

Step 5: An inverse FFT is performed, resulting in 2 kHz time sampled vectors.

Step 6: The accumulated phase of the 2 kHz time sampled vectors is applied to received signal being simulated by performing a complex phase rotation on it.

The TCXO phase noise rotates the received signal carrier randomly during the coherent integration process. This leads to a loss in CNO, and the longer the coherent integration period (i.e. PDI), the larger the loss is expected to be. Using the simulated TCXO phase noise as calculated above, CNO loss due to TCXO phase noise, i.e. $CNO_{loss\ phase\ noise}$, can be further simulated for various cases, for example: Typical phase noise specification (shown in TABLE 2); Typical phase noise specification plus 5 dB phase noise; and Typical phase noise specification minus 5 dB phase noise.

Figure 7:
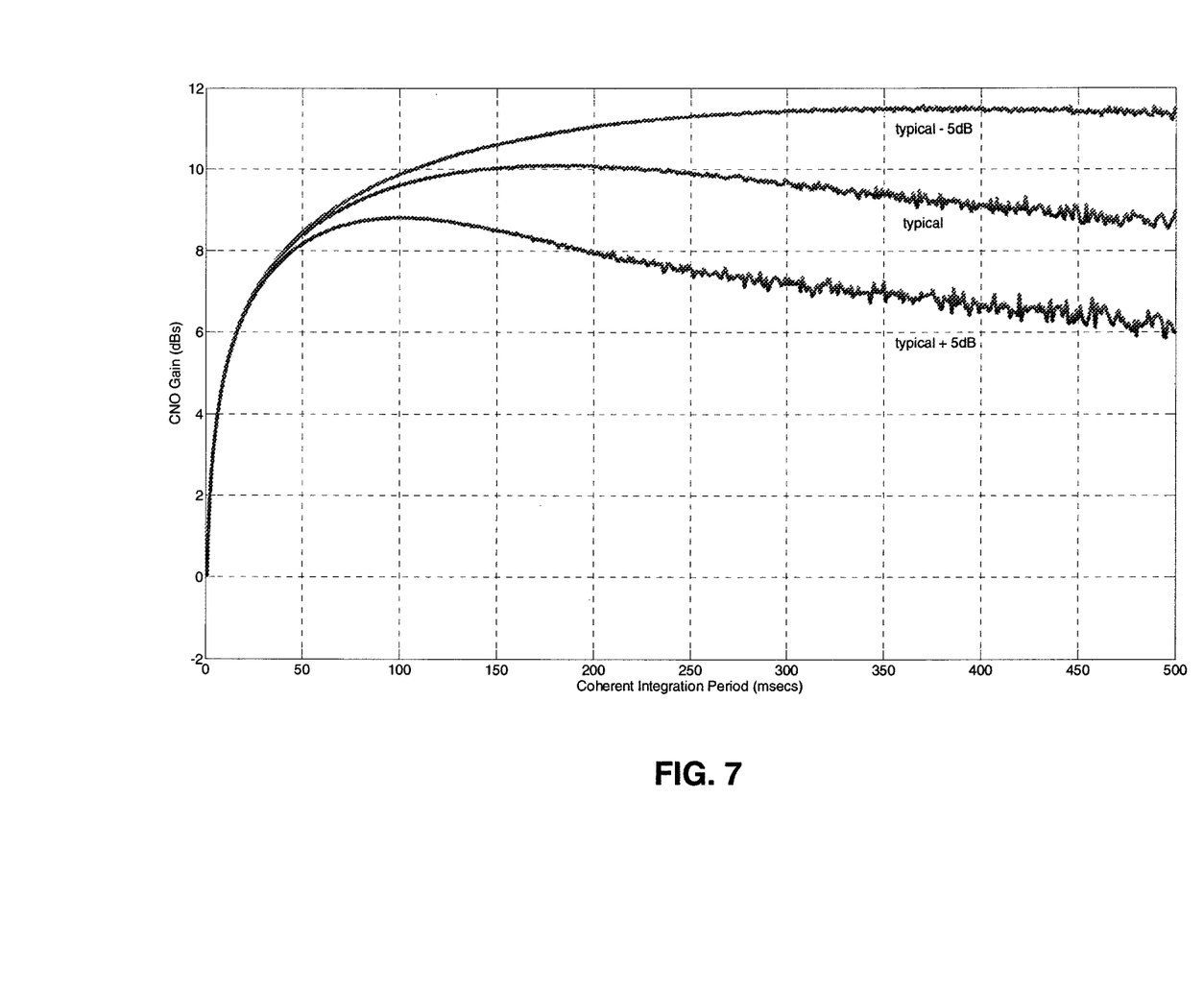
FIG. 7 is a graph illustrating how TCXO phase noise affects tracking performance for different coherent integration periods according to aspects of the invention.

The question arises as to where the optimal design trade-off point is given that the CNO gain (i.e. $CNO_{gain}$) via coherent/non-coherent integration is offset by the CNO loss due to the TCXO phase noise. The combination of the two effects is computed as follows:

$$CNO_{gain} = CNO_{loss\ phase\ noise} + [5 \times \log_{10}(pdi)]$$

Where pdi is the coherent integration period in msecs (1 ... 500). FIG. 7 plots $CNO_{gain}$ with respect to pdi=1 msec for the three cases noted above. For a typical TCXO phase noise such as that modeled above, FIG. 7 shows that the optimal design point with respect to maximizing CNO is around 150 to 200 msecs. As the phase noise improves, the optimal design coherent integration period becomes longer, between 300 to 400 msecs as shown in FIG. 7. As the phase noise deteriorates, the optimal design coherent integration period becomes shorter, between 75 and 125 msecs as shown in FIG. 7. A coherent integration period of 100 msecs is therefore chosen for the design in some embodiments of the invention although it is observed that there is considerable room for change in this value.

It should be noted that a tracking loop having narrow bandwidth such as that made possible in embodiments of the invention is not expected to keep track under significant user dynamics at very low CNOs (5 dB-Hz), Accordingly, an enhanced sensitivity track that is subject to user dynamics relies on a lock detect mechanism such as that described in more detail in co-pending U.S. application Ser. No. 13/341, 852 to prevent erroneous measurements.

As mentioned above, in embodiments of code loop filter 202, the early/late spacing is preferably ¼ chip, as shown in FIGS. 3A and 3B. In these and other embodiments, the nominal IF bandwidth is set at 6 MHz (bandpass), although it may be as wide as 8 MHz. Among other things, the present inventors recognize that the code tracking discriminator slope is reduced for reduced bandwidth. This requires increasing the gain in the discriminator to compensate for this loss of slope. This effect is partially offset by an increase in noise correlation between samples as the bandwidth is reduced.

By computing the code discriminator SNR at ¹⁄₁₆th chip code error, the SNR loss relative to the ¼ chip/8 MHz bandwidth case can be determined. The results show that a ¼ chip spacing such as that illustrated in FIGS. 3A and 3B is the best spacing choice in terms of code tracking loop discriminator SNR, working well with both 6 and 8 MHz IF bandwidth options. The present inventors have further determined that the code discriminator characteristic flattens out for code phase offsets in excess of ≈±0.2 C/A chips. Preferably, therefore, the code phase tracking should be maintained within this boundary. Outside this boundary the code tracking discriminator will still provide a correctly signed loop correction, albeit with a reduced loop gain.

Figure 8:
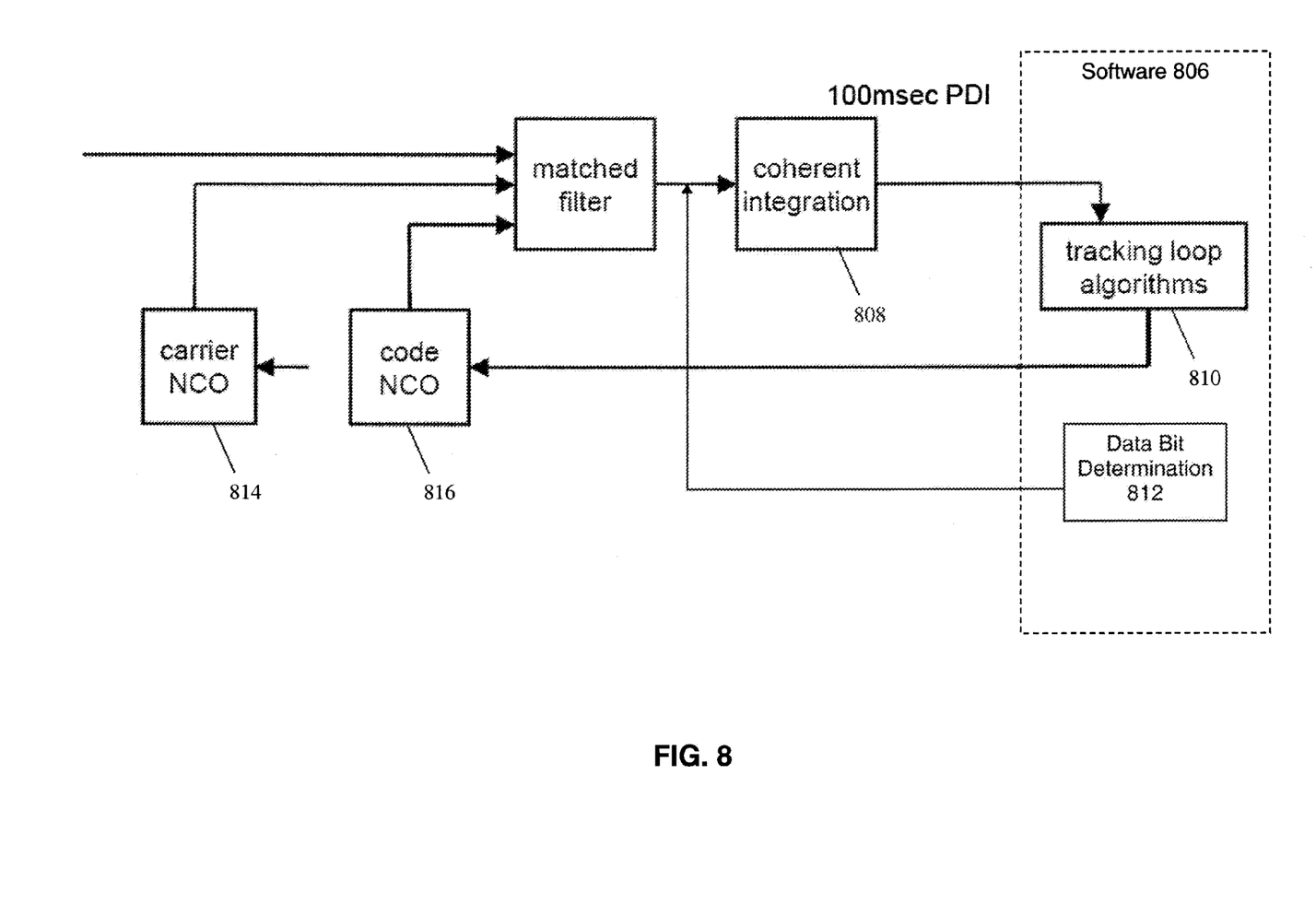
FIG. 8 is a block diagram illustrating an example implementation of adjustable-bandwidth tracking loops utilizing data bit stripping according to embodiments of the invention.

FIG. 8 illustrates one example implementation of a tracking loop 202, 204 according to certain aspects of the invention. As shown in this example, loop 202, 204 uses 100 msec correlation values from coherent integration block 808, which is implemented in hardware. In this example, the 100 msec correlation values are passed to software block 806. Software block 806 includes tracking algorithms 810 (e.g. code loop discriminator 208, code loop filter 210, carrier frequency discriminator 212, AFC loop filter 214, carrier to code aiding 216, magnitude estimate filter 206, etc.), as described above, and the code phase and carrier frequency feedback loops are closed via the hardware channel carrier and code NCO's 814, 816.

In embodiments including those described above and in FIG. 8, the track channel preferably uses data bit stripping with data bits determined by block 812 in software 806. In one example, block 812 determines the data bits using data bit prediction such as that described in U.S. Pat. No. 7,924,220, the contents of which are incorporated herein by reference. In other embodiments, data bits are received from a network or other external aiding service.

In these embodiments, however, it is still not generally possible to predict all of the data bits. When data bits are unknown and a guess value is substituted, it has a long-term 50% chance of being correct. However, guessing data bits will lead on average to noise only integration. This will cause the loops to react randomly.

Accordingly, embodiments of the invention allow "fly-wheeling" through periods of unknown data bits.

For example, during periods of just a few consecutive data bits unknown, the code phase and AFC tracking loops are updated during the particular 100 msecs using the previous 100 msec update. This essentially allows the loops to propagate the current known dynamics (including carrier to code aiding and AFC states).

During short periods of unknown data bits greater than a few but less than one second, for example, the coherent I and Q accumulations are nulled during the periods of unknown data bits. This assumes, however, that the 100 msec I and Q coherent integrations can be broken up into 20 msec data bit segments. Additionally or alternatively, the values of $CL_{disc}$ and $CF_{disc}$ are set to zero in these periods.

The present inventors recognize that for longer periods of unknown data (e.g. ≥1 second), user and TCXO dynamics start to dominate uncertainty. Under these conditions it is recommended that the tracking loops are updated with the last known dynamics, but that the lock detects are reset to the unlock condition.

It should be noted that the unknown data bit "fly-wheeling" principles of the invention can be extended to architectures that have GLONASS receive capability, in addition to or instead of GPS. The operation of GLONASS enhanced sensitivity can be similar to the GPS techniques described herein and in the co-pending application with the exception that some implementations of GLONASS have additional CNO loss when compared with GPS. These losses come from both RF and digital implementations, including additional noise figure loss, noise aliasing and additional quantization loss. The sum of these losses is GLONASS frequency channel dependent.

"Glonass Interface Control Document," Version 5.0 (2002), describes the GLONASS data structure. Each GLONASS data line consists of 2 seconds of data, including 1.7 seconds of Manchester encoded 20 msec differentially encoded data (always starts with '0' bit) and 0.3 seconds of 10 msec encoded time-mark (i.e. preamble). This automatically allows 0.32 seconds of data transitions to be known every 2 seconds. It is possible to drive tracking loops during the known data segment only, and provide zero loop feedback the rest of the time. From an energy available to close the loops perspective this results in an effective loss of 10 $\log_{10}(0.32/2)=-7.96$ dB. The gain obtained via knowing data bits is given by 5 $\log_{10}(100$ msecs/20 msecs$)=3.5$ dB. Hence it is concluded that tracking loops driven only during the 0.32 second data known portion would be significantly worse than just using 20 msec PDI tracking loops. It is also possible to switch tracking loop modes between 20 msecs and 100 msecs depending on data bit availability. This technique is ineffective for enhanced sensitivity tracking as the loops will experience excessive noise jitter during 20 msec mode.

Accordingly, it is preferable to operate the GLONASS enhanced sensitivity loops with all data bits known, although small time gaps in data bit knowledge can be dealt with in the same manner as GPS as described above.

Figure 9:
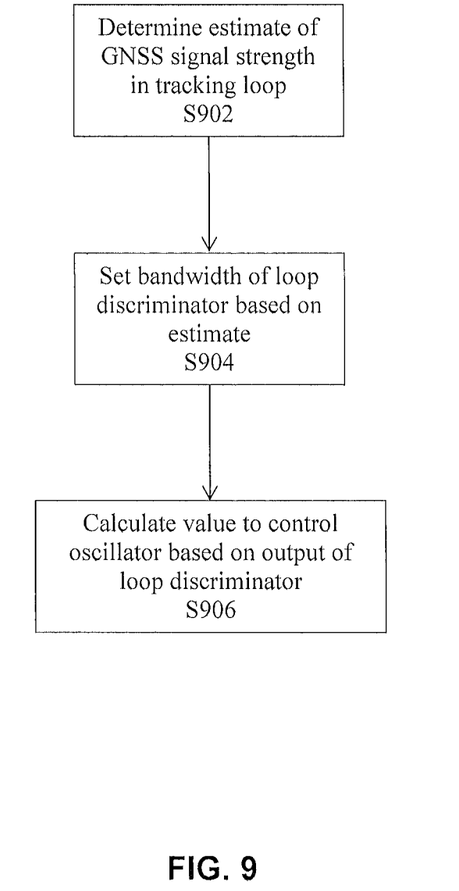
FIG. 9 is a flowchart illustrating an example GNSS tracking method according to embodiments of the invention.

FIG. 9 is a flowchart illustrating an example GNSS tracking method according to embodiments of the invention. As shown in FIG. 9, it includes step S902 of determining an estimate of GNSS signal strength in a tracking loop, step S904 of automatically setting a bandwidth of a tracking loop discriminator based on the estimate and step S906 of calculating a value that is used to control an oscillator in the tracking loop based on an output of the tracking loop discriminator.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A Global Navigation Satellite System (GNSS) tracking apparatus, comprising:
   a magnitude estimator that determines an estimate of GNSS signal strength, wherein the magnitude estimator determines the estimate from 0 Hz carrier frequency offset in-phase and quadrature coherent correlations performed over a plurality of data bits of a GNSS signal;
   a carrier frequency tracking loop discriminator that receives the estimate from the magnitude estimator and automatically sets a bandwidth of the carrier frequency tracking loop discriminator by normalizing one or more +1.25 Hz and −1.25 Hz carrier frequency offset in-phase and quadrature coherent correlations performed over the plurality of data bits of the GNSS signal by the estimate;
   a carrier frequency loop filter that receives an output from the carrier frequency tracking loop discriminator and provides a value that is used to control an oscillator in a tracking loop; and
   a data bit determination block that outputs expected data bits in the GNSS signal, wherein the expected data bits are used to adjust correlation values in the tracking loop, the tracking loop is adapted to operate during periods when the expected data bits are unknown, and the tracking loop is adapted to set a lock detect mechanism to an unlock condition when the expected data bits are unknown for a predetermined amount of time.

2. The apparatus of claim 1, further comprising a code phase tracking loop discriminator that receives code phase integration values and outputs a code phase discriminator value.

3. The apparatus of claim 2, wherein:
the code phase tracking loop discriminator receives the estimate from the magnitude estimator and automatically sets a bandwidth of the code phase tracking loop discriminator based on the estimate; and
a code phase loop filter that receives an output from the code phase tracking loop discriminator and provides a second value that is used to control a second oscillator in the tracking loop.

4. The apparatus of claim 3, wherein the second value is $code_{phase}(k+1)$ calculated for an interval k+1 based on a previous interval k by the equation:

$$code_{phase}(k+1)=code_{phase}(k)+(CL_{coeff} \times CL_{disc}(k+1))$$

where $CL_{disc}(k+1)$ is the output from the code phase tracking loop discriminator that is based on normalized one or more non-zero offset in-phase and quadrature coherent correlations, and wherein $CL_{coeff}$ is a coefficient that sets code loop bandwidth that is based on a one-sided equivalent noise bandwidth of the code phase loop filter and a loop sampling rate.

5. The apparatus of claim 2, wherein the code phase tracking loop discriminator automatically sets a bandwidth of the code phase tracking loop discriminator by normalizing one or more ¼ early and late offset in-phase and quadrature coherent correlations performed over the plurality of data bits of the GNSS signal by the estimate.

6. The apparatus of claim 1, wherein the carrier frequency tracking loop discriminator receives carrier frequency integration values and outputs a carrier frequency discriminator value.

7. The apparatus of claim 6, further comprising a carrier to code aiding block that receives the value from the carrier frequency loop filter and calculates a frequency aiding term based thereon.

8. The apparatus of claim 1, wherein the carrier frequency tracking loop discriminator determines the output based on integration values integrated from correlation values over a time interval spanning a plurality of data bit intervals in the GNSS signal.

9. The apparatus of claim 8, wherein the plurality of data bit intervals is selected based on local carrier oscillator (TCXO) dynamics.

10. The apparatus of claim 1, wherein the value is $F_{carrier}(k+1)$ calculated for an interval k+1 based on a previous interval k by the equation:

$$F_{carrier}(k+1)=F_{carrier}(k)+(D_1 \times CF_{disc})+AFC_{accel}(k+1)$$

where $CF_{disc}$ is the output from the carrier frequency tracking loop discriminator that is based on the normalized one or more +1.25 Hz and −1.25 Hz carrier frequency offset in-phase and quadrature coherent correlations, and wherein $D_1$ is a coefficient that sets carrier frequency loop bandwidth that is based on a one-sided equivalent noise bandwidth of the carrier frequency loop filter, and wherein $AFC_{accel}(k+1)$ is an estimate of acceleration by the carrier frequency loop filter that is based on the one-sided equivalent noise bandwidth of the carrier frequency loop filter and on $CF_{disc}$.

11. A Global Navigation Satellite System (GNSS) tracking method, comprising:
determining an estimate of GNSS signal strength in a tracking loop using 0 Hz carrier frequency offset in-phase and quadrature coherent correlations performed over a plurality of data bits of a GNSS signal;
automatically setting a bandwidth of a carrier frequency tracking loop discriminator by normalizing one or more +1.25 Hz and −1.25 Hz carrier frequency offset in-phase and quadrature coherent correlations performed over the plurality of data bits of the GNSS signal by the estimate;
calculating a value that is used to control an oscillator in the tracking loop based on an output of the carrier frequency tracking loop discriminator; and
determining expected data bits in the GNSS signal;
adjusting correlation values in the tracking loop using the expected data bits;
adapting the tracking loop to continue operation during periods when the expected data bits are unknown; and
adapting the tracking loop to set a lock detect mechanism to an unlock condition when expected data bits are unknown for a predetermined amount of time.

12. The method of claim 11, further comprising a code phase tracking loop discriminator that receives code phase integration values and outputs a code phase discriminator value.

13. The method of claim 12, further comprising:
automatically setting a bandwidth of the code phase tracking loop discriminator based on the estimate; and
calculating a second value that is used to control a second oscillator in the tracking loop.

14. The method of claim 11, wherein the carrier frequency tracking loop discriminator receives carrier frequency integration values and outputs a carrier frequency discriminator value.

15. The method of claim 14, further comprising:
calculating a frequency aiding term based on the value.

16. The method of claim 11, wherein the carrier frequency tracking loop discriminator determines the output based on integration values integrated from correlation values over a time interval spanning a plurality of data bit intervals in the GNSS signal.

17. The method of claim 16, further comprising:
selecting the plurality of data bit intervals based on local carrier oscillator (TCXO) dynamics.

* * * * *